3,704,318
PROCESS FOR THE PRODUCTION OF N-CAR-
BAMIDES OF AMINO ACIDS CONTAINING
THIOL GROUPS
Adolf F. Stark, Munich, Allach, and Winfried Kolbeck and Friedrich J. Bayerlein, Munich, Germany, assignors to Diamalt Aktiengesellschaft, Munich, Germany
No Drawing. Filed June 29, 1966, Ser. No. 561,385
Int. Cl. C07c *149/24*
U.S. Cl. 260—534 S                    6 Claims

ABSTRACT OF THE DISCLOSURE

The process for the preparation of N-carbamides of thiol amino acids by reacting the amino acid with salts of cyanic acid in a basic medium.

---

The present invention relates to processes for the production of N-carbamides of amino acids which contain thiol groups. The invention also relates to the use of the N-carbamides of amino acids containing thiol groups as therapeutically effective agents in drugs for treating diseases which are due to the secretion of hyperviscous phlegm.

It is known that N-acetylcysteine and similar N-acylated sulfhydryl compounds derived from cysteine have a mucolytic effect and are suitable for treatment of the respiratory organs. They have the advantage of good compatibility with other drugs, but their use is hindered by the fact that these substances are relatively difficult to manufacture and accordingly are rather expensive.

It is an object of the present invention to make available substances which have a great mucolytic effect and which can be used therapeutically and are simple to manufacture.

It is known that hydantoins can be obtained by reacting α-amino-acids with alkali salts or esters of isocyanic acid. It is also known that the reaction of simple amino acids, which carry only an amino group as the reactive grouping, with salts of cyanic acids leads to ureido acids. In this way, simple ureido acids, such as ureidopropionic, ureido succinic acid and so forth have been produced.

The reaction of amino acids, which contain in addition to the amino group, other reactive groupings in the molecule, with salts of cyanic acid has not been used successfully so far. According to the rules of organic chemistry, it was to be expected that, in the case of cysteine, the thiol group preferentially reacts on the basis of its higher nucleophilicity and forms primarily an S-carbamide. This S-carbamide should, in a manner similar to the α-amino-β-rhodanopropionic acid formed from cysteine and potassium cyanide, preferably cause the closing of the ring to form 2-amino-thiazoline-carboxylic acid-4, whose extreme stability to hydrolysis is known. Similarly, one obtains, in the reaction of dialkyl sulfates with cysteine in the presence of bases, almost exclusively S-alkyl-cysteine derivatives whose amino function remains unchanged. The simple production of S-carboxymethylcysteine from sodium chloroacetate and cysteine is another example of this type of reaction.

According to the present invention, it was surprisingly found that amino acids containing thiol groups can be converted selectively in the presence of bases with salts of cyanic acid in a good yield into N-carbamides if the reaction medium contains 1–30% and preferably 2–7% potassium ions.

The subject of the invention is thus a process for the production of N-carbamides of amino acids containing thiol groups, in which solutions of amino acids containing thiol groups are reacted in a conventional solvent, particularly in water, in the presence of bases with salts of cyanic acid, the reaction medium containing 1–30% potassium ions based on the weight of the medium consisting of amino acid, solvent and cyanate.

As amino acids there can be used for example, cysteine, homocysteine or penicillamine. Preferably cysteine is used, which then leads to the formation of cysteinecarbamide.

It is surprising that the above mentioned reaction leads, in the presence of potassium ions, directly in an excellent yield to the N-carbamides. Such a reaction course was not to be expected on the basis of the foregoing considerations, and it was particularly surprising that the reaction leads with a practically quantitative yield exclusively to N-carbamide, while in the reaction of cysteine under otherwise equal conditions with cyanate ions in the absence of potassium ions leads to at most a yield of 33% N-carbamide.

As salts of the cyanic acid, the alkali and alkaline earth cyanates, such as sodium cyanate, potassium cyanate or calcium cyanate are particularly suitable. Other salts are not excluded, however.

As a solvent is used, in addition to water, polar organic solvents, such as alcohols and the like, if necessary in mixture with water. Normally the amino acids are brought to reaction in 1-molar solution. The concentration, however, can vary within broad ranges and can be much higher or much lower than this normal concentration, depending on the solubility of the amino acids.

As bases can be used strong alkalies, preferably alkali hydroxides, but also alkali carbonate, bicarbonates or tertiary amines, like triethylamine and so forth, as well as a corresponding high excess of alkali cyanate.

Instead of the free amino acids, their salts can also be used such as, for example, hydrochlorides, sulfates and the like. The various mercaptoamino acids are also suitable for the process according to the invention, particularly cysteine, homocysteine, and penicillamine, cysteine being preferred.

The process is carried out in that the solution of the amino acid or its salt is standardized to a pH value between 7 and 14 and is mixed preferably in a ratio of 8–9 parts with 1.0–3.0 parts, preferably 1.1–2.0 parts of cyanate based on weight of the solution. The resulting mixture is reacted at a temperature between 20° and 100° C., and preferably at 40° to 50° C., for 10 to 150 hours, the reaction time being inversely proportional to the selected temperature. The N-carbamides which are obtained are of high purity and are colorless, crystalline compounds which are stable up to the melting point. They are readily soluble in aqueous sodium bicarbonate.

The N-carbamides produced by the process according to the invention are valuable intermediate products for the production of cosmetics and drugs. More particularly, it was found according to the invention that these compounds are characterized by a great mucolytic activity and are therefore very suitable for fighting diseases which are caused by the secretion of hyperviscous phlegm. Particularly suitable among these products for this therapeuatic purpose are cysteine carbamide, homocysteine carbamide and penicillamine carbamide, cysteine carbamide being particularly preferred among the foregoing. The substances produced according to the invention are also suitable for activating and stabilizing enzymes, such as papaine, and vitamins, such as vitamin C, for example.

The cysteine carbamide preferred according to the invention has the following formula

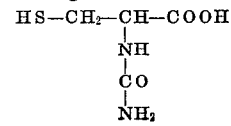

But naturally the functional derivatives of cysteine carbamide, as well as of the other N-carbamides produced according to the invention, for example, those which can be obtained by salt formation or by N- or C-alkylation with low-molecular alkyl radicals from the basic substances, also come within the scope of the invention.

The invention therefore also relates to a process for the treatment of diseases which are caused by the secretion of hyperviscous phlegm, such as mucoviscidosis, chronic bronchiopulmonary diseases, pneumonia, bronchitis, tracheobronchitis, where the diseased organs are brought in contact in usual manner such as, for example, by spraying, inhalation, breathing a mist, brushing and so forth, with a medicament which consists substantially of a N-carbamide according to the invention, and preferably cysteine-carbamide dissolved in a conventional solvent or containing solvent or containing this substance.

For the treatment of the pharyngo nasal cavity the substances according to the invention are preferably applied by drops, the substances being dissolved in water. For the treatment of the lower respiratory organ and of the bronchi the substance is preferably dissolved in a solvent and sprayed or atomized and thus applied by inhalation. In the treatment of the vagina, the substances of the invention are produced in diluted solutions which are used for douches.

Cysteine carbamide can be used alone or in combination with other therapeutically effective substances, which can further enhance the activity of these new substances. It may be advisable to apply the substance with conventional pharmaceutical vehicles or together with antibiotics, disinfectants or chemotherapeutic agents. The compatibility of the N-carbamides of the invention with other therapeutic agents is a particularly advantageous feature of the invention. Investigations have shown that the N-carbamides according to the invention are relatively non-toxic.

In an interperitoneal injection of a 20% suspension of cysteine-carbamide using mice as the test animals, the LD/50 was determined with 1.8 g./kg.; for the intravenous injection of the 10% solution of the sodium salt, the LD/50 was found to be 2 g. cysteine carbamide per kg.

Three rabbits each received 3 ml. of a 0.5% solution of the acid per kg. in a pyrogen-free 0.9% common salt solution and 3 ml. of the 5% solution of the Na-salt in pyrogen-free water per kg. injected intravenously. The animals showed a completely normal behavior. No change was observed in their behavior or in their weight.

The following examples illustrate the production of the cysteine carbamide. All parts are parts by weight, unless stated otherwise.

EXAMPLE 1

12.0 parts of cysteine dissolved in 100 parts of 5% potash lye are mixed with 9.6 parts of potassium cyanate and the reaction mixture is maintained for 144 hours at 40° C. Subsequently, concentrated hydrochloric acid is added until a pH value of 1 is obtained, and the colorless carbamide is separated in high purity. The product is sucked off and dried. Yield: 16.1 parts (99%), melting point 174° C.

EXAMPLE 2

100 parts of a 1 molar cysteine hydrochloride solution are mixed with 8 parts of sodium hydroxide. Then 8.6 parts of potassium cyanate are added and the reaction mixture is maintained for 144 hours at 40° C. After acidification to pH 1, the process is completed as in Example 1. Yield: 16.2 parts (99%).

EXAMPLE 3

To 100 parts of a 1 molar aqueous cysteine hydrochloride solution are added 11.2 parts of potassium hydroxide and 13.0 parts of sodium cyanate and the reaction mixture is treated as in Example 1. Yield: 15.5 parts (95%).

EXAMPLE 4

100 parts of a 1 molar cysteine hydrochloride solution are mixed with 8 parts of sodium hydroxide, as well as 13.0 parts of potassium cyanate and the mixture is reacted for 24 hours at 80° C. Completion of preparation is as in Example 1. Yield: 13.0 parts (79%).

The following examples describe the therapeutic application of the substances according to the invention.

EXAMPLE 5

A 0.25 molar solution of cysteine carbamide in water, which was buffered with $Na_2CO_3$ to pH 7.0, was produced. This solution was used as nose drops.

EXAMPLE 6

20 g. cysteine carbamide were dissolved in 80 g. distilled water to which was added sodium hydroxide and the pH value was standarized to 7.0. This solution was used for inhalation.

EXAMPLE 7

1 g. homocysteine carbamide was dissolved in 1000 g. distilled water and buffered with about 1 g. sodium bicarbonate to pH 7.0. This solution was used as a vaginal cleansing agent.

What is claimed is:
1. A method for preparing N-carbamides comprising reacting in solution an amino acid containing a thiol group selected from the group consisting of cysteine, homocysteine and penicillamine and salts thereof with an alkali or alkaline earth salt of cyanic acid in the presence of a base at a pH of from 7 to 14 and a temperature of 20°–100° C. to obtain a N-carbamide.

2. A method as claimed in claim 1 wherein reacting of the acid and salt is effected in a reaction medium containing 1–30% by weight of potassium ions.

3. A method as claimed in claim 1 wherein the base is selected from the group consisting of alkali hydroxides, alkali carbonates, alkali bicarbonates and tertiary amines.

4. A method as claimed in claim 2 wherein the base is selected from the group consisting of alkali hydroxides, alkali carbonates, alkali bicarbonates and tertiary amines.

5. An N-carbamide having the formula

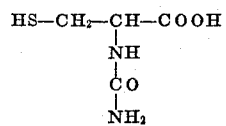

6. N-carbamides which are homocysteine carbamide and penicillamine carbamide.

References Cited

UNITED STATES PATENTS 2,421,233  5/1947  Auchincloss et al. ____ 260—482

LORRAINE A. WEINBERGER, Primary Examiner

P. J. KILLOS, Assistant Examiner

U.S. Cl. X.R.

260—306.7; 424—319

UNITED STATES PATENT OFFICE
CERTIFICATE OF CORRECTION

Patent No. 3,704,318  Dated November 28, 1972

Inventor(s) ADOLF F. STARK ET AL

It is certified that error appears in the above-identified patent and that said Letters Patent are hereby corrected as shown below:

In the heading to the printed specification, after line 8, insert -- Claims priority, application Germany, December 7, 1965, D48855 --.

Signed and sealed this 1st day of May 1973.

(SEAL)
Attest:

EDWARD M. FLETCHER, JR.　　　　　ROBERT GOTTSCHALK
Attesting Officer　　　　　　　　Commissioner of Patents